United States Patent Office 2,957,023
Patented Oct. 18, 1960

2,957,023

TREATMENT OF PLASTICIZER ESTERS WITH ALKALI METAL BOROHYDRIDES

William A. Dimler, Jr., Colonia, and Alan A. Schetelich, Cranford, N.J., assignors to Esso Research and Engineering Company, a corporation of Delaware No Drawing. Filed May 29, 1957, Ser. No. 662,328

8 Claims. (Cl. 260—475)

This invention relates to the stabilization of alcohols contaminated with carbonyl and/or unsaturated compounds such as olefins by the use of a certain inhibitor whereby plasticizer esters having improved color properties may be obtained. This invention relates especially to the inhibition against color degradation of oxo alcohols.

This invention also relates to the method of stabilizing alcohols contaminated as noted above. Still more specifically this invention relates to the use of certain metallic borohydrides as color inhibitors in the preparation of plasticizer esters.

The ever expanding use of plastic materials such as vinyl chloride polymers or copolymers, polyvinyl acetate, cellulose esters, acrylate and methacrylate resins, rubbers such as the emulsion copolymers of butadiene and styrene or acrylonitrile, or the copolymers of isobutylene with small smounts of a diolefin such as isoprene, has created a large demand for suitable plasticizers. Branched chain alkyl organic esters and particularly alkyl phthalic acid esters and more particularly octyl and decyl phthalate, as well as the esters of maleic acid, adipic acid, azelaic acid, sebacic acid or their anhydrides, have been known to be extremely satisfactory plasticizers for the aforementioned high molecular weight materials. For the esterification, an acid reacting compounds having two acid radicals such as dicarboxylic acids and/or their anhydrides are suitable reactants with the desired alcohol.

These plasticizer esters are generally prepared by the esterification of a suitable alcohol, e.g. $C_6$ to $C_{14}$ alcohol, with an acidic reactant such as phthalic acid, the anhydride thereof or any of the acidic reactants noted above. In general, the alcohol is employed in amounts from stoichiometric to substantial excesses and heated, preferably in the presence of an acid catalyst such as benzene sulfonic acid, toluene sulfonic acid, naphthalene sulfonic acid or the like. Entrainers or azeotrope formers may be employed during the reaction to effect the removal of water at lower temperatures since it is known that severe operating conditions, including high temperatures and strongly acidic catalysts, tend to magnify any discoloration which may result from contaminants in the alcohol reactant. Entrainers usually employed are the low boiling aromatics such as benzene, toluene, xylene and the like, paraffinic hydrocarbons of suitable boiling points, e.g. heptene and octane or olefinic materials such as diisobutylene, etc. Various processes applicable to the manufacture of these plasticizer esters are known and this invention does not depend on any specific one. Also numerous acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that impurities connate to oxo alcohols, e.g. carbonyl compounds, carbonyl-forming compounds such as acetals and various unsaturated compounds such as olefins affect to a marked degree the color of the final ester product. To counteract the degradation of color resulting from these contaminants, many commercial esterification processes utilize mild conditions and carefully control the reaction medium. Thus mild p-toluene sulfonic acid is often employed in lieu of sulfuric acid and the reaction mixture is kept free of oxygen usually by blanketing the system with $CO_2$ or other inert gases. Para-toluene sulfonic acid is considerably more expensive than sulfuric acid and more sulfonic acid is necessary due to its lower order of activity. Therefore it would be a considerable advance in the art and a substantial savings in manufacturing cost if sulfuric acid could be employed with alcohols contaminated as described above and if the esterification reaction could be run open to the atmosphere and still obtain high color quality products.

Even when the mild p-toluene sulfonic acid catalysis and the use of inert atmosphere are employed, the resulting plasticizer ester is often discolored to a serious degree. Insofas as the plasticizer industry is concerned, the color of the plasticizer product is one of the most important quality factors involved in the selection of the alcohol intermediate to be used in the esterification process. Thus the obtention of water-white plasticizers represents the epitome of plasticizer color quality and the quality rating becomes lower as the product becomes deeper in color.

At present a principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol product. While the sulfur contaminants introduced into the product by either the olefin or the hydrogenation catalyst, etc., may be cleaned up effectively by caustic washing, extensive distillation and similar treatments, the final alcohol product obtained in general will contain sufficient amounts of carbonyl compounds such as acetals, aldehydes, etc., and unsaturated compounds, to seriously affect the ultimate color qualities of any ester prepared therefrom. The term "carbonyl compound" is employed herein to mean those compounds containing an aldehyde radical and those compounds which readily form aldehydic compounds. Oxo alcohols will contain generally from 0.01 to 1.0 wt. percent or higher of carbonyl compounds. Dimer alcohols prepared by a modified oxo route are also valuable as intermediates in the preparation of esters and are subject to the same contamination problems as the ordinary oxo alcohols. Oxo octyl alcohol, or as it is called "isooctyl alcohol," comprises major amounts of dimethyl-1-hexanol and minor amounts of methyl-1-heptanol and smaller amounts of miscellaneous branched alcohols. Oxo decyl alcohol varies in isomeric composition; however it comprises predominantly trimethyl heptanols.

One potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separatable from the alcohol or separatable only with extensive costly treatment. Alternatively the alkyl metal may be made directly by reaction of olefin with metal and $H_2$. An alkyl metal of this type is easily converted to alcohols in the manner described above. This invention is amenable to the use of alcohols having the aforementioned contaminants regardless of how the alcohols are prepared.

It is therefore a primary object of this invention to treat the contaminated alcohols in a manner which will permit the preparation of plasticizer esters having improved color properties. It is a further object of this invention to purify the alcohol sufficiently to permit the use of more severe esterification processes, including the use of sulfuric acid catalyst and atmospheric conditions.

Without unduly lengthening the present specification and for the purpose of defining with more particularity some of the alcohol sources, reference may be had to U.S. Patent No. 2,637,746 to Parker, which describes in detail the oxo process, and to a copending commonly assigned application, Serial No. 578,902, which describes one process for preparing alcohols via the alkyl metal route.

It has now been found that certain metallic borohydrides when employed in very minute quantities, e.g. 5 to 300 p.p.m., effectively inhibit discoloration of the plasticizer ester whether it is prepared by the severe conditions of sulfuric acid catalysis and the reaction is carried out in the presence of air or under the mild conditions of sulfonic acid catalysis under an inert atmosphere. The color degradation inhibitors of this invention comprise the alkali metal borohydrides such as sodium borohydride and potassium borohydride. Since the alkali metal borohydrides are relatively insoluble in higher molecular weight alcohols of the type employed herein, e.g. $C_6$ to $C_{14}$, it is preferable to employ a solvent. The particular solvent employed is one of choice and does not relate to the heart of this invention. Some of the solvents which may be employed include water, isopropanol, ethanol, low molecular weight amines and the like. The effect of alkali metal borohydrides as color inhibitors during the esterification process is marked regardless of the esterification conditions employed. For example, an improvement in plasticizer color will be obtained with toluene sulfonic acid catalysis as well as with sulfuric acid catalysis. The akali metal borohydride may be added during the esterification reaction or immediately prior to the reaction. However it has been found that the inhibitor is many times more effective if it is added to the alcohol and the inhibited or stabilized alcohol is aged for a period of time, e.g. at least one day. The effect of aging appears to reach an optimum at about four days. Aging the stabilized alcohol for a period beyond this does not appear to effect any further improvement in the color quality of the plasticizer. The exact mechanism involved is not completely understood and no attempt at explanation will be made. Accordingly this invention comprises a stabilized alcohol composition containing stabilizing quantities of alkali metal borohydrides. This invention also relates to the esterification of alcohols stabilized by the use of alkali metal borohydrides.

The esterification process to which this invention relates comprises the reaction of 2 to 2.5 moles of alcohol per mole of the desired dicarboxylic acid or anhydride in the presence of an acid catalyst such as p-toluene sulfonic acid, benzene sulfonic acid, sulfuric acid, and the like, at a temperature of about 100° to 200° C. for a period of 30 to 180 minutes. The reaction mixture may be blanketed under slight pressure by $CO_2$, $N_2$ or other inert gases to exclude oxygen. The amount of catalyst employed may vary in accordance with its activity. For example as little as 0.05 wt. percent on alcohol, if sulfuric acid is the catalyst, while as much as 7.0 wt. percent of toluene sulfonic acid may be employed. Benzene, toluene or the like is generally employed to remove water as it is formed in an amount of 5 to 50% by weight based on alcohol.

Another major advantage of this process is that alcohols from any source which are contaminated with carbonyl or carbonyl-forming or unsaturated compounds in an amount which previously was prohibitive may now be employed to produce high quality esters where formerly due to carbonyl contaminants they were not suitable as reactants.

To demonstrate the effectiveness of the alkali metal borohydride as a color inhibitor for the esterification process several experiments were carried out with oxo decyl alcohol containing minor amounts of carbonyl compounds and unsaturated contaminants with and without various quantities of the additive. These tests were actual esterifications of oxo decyl alcohol and phthalic anhydride. The following table sets forth the conditions and results obtained:

Table 1

Temperature: 125° to 165° C.
Pressure: 0 p.s.i.g.
Atmospheric Conditions: Air
Time of Reaction: 90 Minutes
Entrainer: Toluene, 20 wt. Percent on Alcohol

| Sample | Catalyst Wt. Percent on Theoretical Ester | |
|---|---|---|
|  | 1% $H_2SO_4$ | 2% TSA** |
|  | Hazen Number | |
| Unaged Alcohol and Inhibitor: | | |
| Decyl Alcohol Control | >200 | 70 |
| Control +60 p.p.m. $NaBH_4$* | 75 | 50 |
| Control +30 p.p.m. $NaBH_4$* | 140 | |
| Alcohol and Inhibitor Aged 12 Days after Mixing: | | |
| Decyl Alcohol (Control) | >200 | 65–70 |
| Decyl Alcohol +30 p.p.m. $NaBH_4$* | 65 | |
| Decyl Alcohol +60 p.p.m. $NaBH_4$* | 35 | 5–10 |
| Decyl Alcohol +150 p.p.m. $NaBH_4$* | 45 | 5–10 |

*$NaBH_4$ in 30% aqueous solution.
**Toluene sulfonic acid.

In the above tests the reaction mixture including the indicated amounts of additive was heated to about 125° C. The temperature was raised slowly to 165° C. over a period of 90 minutes. The reaction product mixture was then cooled, neutralized with dilute aqueous caustic and then washed with water. The discrepancies in Hazen Number employing equivalent amounts of sodium borohydride are due to the aging period. It will be noted that a significant decrease in color was obtained without aging. A further and more marked improvement is noted when the stabilized alcohol was aged for a period of twelve days.

To demonstrate the effect of aging upon the ultimate color quality of the plasticizer, control tests were run employing sodium borohydride in alcohol, aged for various periods of time. Table II below shows the results of these tests. For these examples a decyl alcohol containing less than 0.06 wt. percent carbonyl was employed in a ratio of 2.15 moles of alcohol to 1 mole of phthalic anhydride with 75 cc. toluene or 20% by weight on alcohol as conventional entrainer. In the runs sodium borohydride was employed in an amount of 30 p.p.m. based on alcohol. The percentage of catalyst is based on theoretical ester. The reaction was carried out by raising the temperature of the mixture from 125° to 165° C. over a period of 90 minutes. Aging of the uninhibited alcohol does not affect the color quality of the esterification product.

Table II

| Days Aged | NaBH₄ 30 Wt. Percent Aqueous Solution | | Decyl Alcohol Control | |
| --- | --- | --- | --- | --- |
| | TSA 2 Wt. Percent | H²SO₄ 1 Wt. Percent | TSA 2 Wt. Percent | H²SO₄ 1 Wt. Percent |
| 0 | [1] 50 | 150 | 80 | 500 |
| 1 | 50 | 110 | | |
| 3 | 20 | 75 | | |
| 4 | 25 | 20 | | |

[1] Numbers refer to Hazen scale.

The above data show that an improvement in ester color may be obtained by aging the alkali metal borohydride in the alcohol prior to the esterification. It is noted that aging for a period of one day effects a considerable improvement in the color, with sulfuric acid catalysis. An aging period of beyond four days does not substantially affect the ultimate color quality of the plasticizer. It is apparent from Table I that higher concentrations of alkali metal borohydride, e.g. 60 p.p.m., would effect improved results over the data in Table II. However, extremely high concentrations of alkali metal borohydride, e.g. over 300 p.p.m., should be avoided since the alkali metal borohydride at higher concentrations would tend to react with the alcohol and cause some degradation of product.

By the term "metallic borohydride" it is meant to include organic alkali metal borohydrides, e.g. those having 1 to 3 of the hydrogen atoms replaced by an organic radical such as $C_1$ to $C_8$ alkoxy, $C_1$ to $C_8$ alkyl, and $C_1$ to $C_8$ carboxy. Some examples of these alkali metal borohydrides are

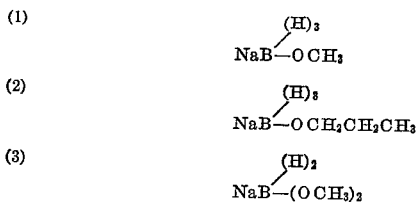

These organic alkali metal borohydrides such as described above have varying degrees of solubility in the alcohol to be stabilized depending on the organic radical or radicals attached to the boron atom. For example the sodium boron methoxy trihydride may be sufficiently soluble in the alcohols noted above so that a solvent would not be required whereas the sodium tetraborohydride requires a solvent for the most effective stabilizing action.

The stabilized alcohol containing the inhibitor of this invention may, if desired, be washed with water to remove the inhibitor prior to esterification. After the alcohol is free from the inhibitor it remains in a stabilized condition indefinitely. In some cases treating the alcohol with the inhibitor and removing it prior to esterification is more effective than carrying out the esterification with the additive present.

What is claimed is:

1. In a method for preparing a plasticizer ester wherein a contaminated $C_6$ to $C_{14}$ oxo alcohol containing connate impurities, including carbonyl compounds and acetals, is reacted with an acidic compound selected from the group consisting of dibasic acids and their anhydrides, the improvement which comprises contacting said oxo alcohol with an amount of alkali metal borohydride in excess of 5 p.p.m. and sufficient to destroy said connate impurities and aging the alkali metal borohydride containing oxo alcohol for a period of at least one day prior to said esterification reaction.

2. A method in accordance with claim 1 wherein said esterification reaction is carried out in the presence of an acid catalyst.

3. A method in accordance with claim 2 wherein said acid catalyst is sulfuric acid.

4. A method in accordance with claim 2 wherein said acid catalyst is toluene sulfonic acid.

5. In a process for the preparation of an ester suitable for use as a plasticizer wherein an acidic reactant selected from the group consisting of dibasic acids and their anhydrides is reacted with at least 2 moles of a contaminated $C_6$ to $C_{14}$ oxo alcohol containing connate impurities, including carbonyl compounds and acetals, at elevated temperatures, the improvement which comprises contacting said oxo alcohol with alkali metal borohydride to incorporate 5 to 300 p.p.m. of said alkali metal borohydride in said alcohol and aging the said alcohol containing alkali metal borohydride for at least one day prior to said esterification reaction.

6. A process in accordance with claim 5 wherein said alkali metal borohydride is sodium borohydride.

7. A process in accordance with claim 5 wherein said alcohol is octyl alcohol.

8. A process in accordance with claim 5 wherein said alcohol is decyl alcohol.

References Cited in the file of this patent

UNITED STATES PATENTS

| | | |
| --- | --- | --- |
| 1,681,238 | James | Aug. 21, 1928 |
| 2,525,354 | Hoog et al. | Oct. 10, 1950 |
| 2,614,128 | Mertzweiller | Oct. 14, 1952 |
| 2,780,643 | Buchner | Feb. 5, 1957 |
| 2,867,651 | Wise | Jan. 6, 1959 |

OTHER REFERENCES

Chaiken et al.: J. Am. Chem. Soc., 71, 122–5 (1949).
Nystrom et al.: J. Am. Chem. Soc., 71, 3245–6 (1949).
Kollonitsch et al.: Nature, 173, 125–6 (1954).